United States Patent Office 2,900,227
Patented Aug. 18, 1959

2,900,227

ION EXCHANGE PROCESS—REMOVAL OF SULFATE IONS FROM ELUATE

William B. Dancy and Alfred F. Nylander, Carlsbad, N. Mex., assignors to International Minerals & Chemical Corporation, a corporation of New York No Drawing. Application January 13, 1956
Serial No. 558,820

4 Claims. (Cl. 23—14.5)

This invention relates to an improved process for the recovery of uranium salts from a sulfate containing solution. More particularly it relates to an improved process in which uranium salts are recovered from a sulfate containing solution by means of ion exchange resins. Still more particularly, it relates to a method of controlling the amount of impurities in the liquid streams of a process in which uranium salts are recovered from acidic solutions by means of ion exchange resins.

Ores such as carnotite and phosphate rock which contain uranium, may be treated with sulfuric acid to solubilize the uranium values. Other compounds in the ores are also solubilized along with the uranium values. Numerous processes have been developed to selectively recover the uranium values from this type of solution. One method of accomplishing this is to contact the acid solution with an ion exchange resin which will sorb a uranyl complex on the resin. The resin bearing the uranyl complex is eluted with an acidic solution to remove the uranyl complex from the resin. Neutralization of the eluate with an alkaline compound such as magnesium oxide causes the precipitation of a uranium salt. After separation of the uranium salt, the barren eluate may be reconstituted and recycled to elute additional uranium bearing resin.

When a sulfate solution containing soluble uranium compounds is passed through an ion exchange resin bed, the uranium is sorbed on the resin as a uranyl sulfate complex. An ammonium nitrate solution, which has been adjusted to a pH of about 1.2 with sulfuric acid may be used to elute the uranyl sulfate complex from the resin. After neutralization of the eluate with MgO or other alkaline compound and separation of the uranium salt, the barren eluate may be reconstituted for recycle to additional uranium bearing ion exchange resin beds. However, the sulfate concentration will gradually increase in this solution since sulfuric acid is added to adjust the pH and since sulfate present in the uranyl sulfate complex remains in solution after precipitation of the uranium salt. Eventually the sulfate content increases to a point where ammonium-magnesium double salts, for example $(MgSO_4 \cdot (NH_4)_2SO_4 \cdot 6H_2O)$, or other undesirable sulfate salts will precipitate with the uranium salt. In addition, the boron concentration in the solution may also reach a point where boron compounds will precipitate with the uranium salt.

In order to prevent the contamination of the uranium product, a means must be provided to control the build-up of impurities in the system. In some processes the entire eluate is discarded, while in other processes the impurities are controlled by bleeding-off a portion of the barren eluate. As much as 20% of the barren eluate may be discarded and the remainder is reconstituted and recycled. Although this method is effective in controlling the amount of impurities in the system, there is also a significant loss of reagents such as ammonium nitrate. Since the barren eluate contains a small percentage of uranium, there is also a loss of uranium in the bleed-off stream.

It is an object of the present invention to provide an improved process for the recovery of uranium compounds from acidic solutions by means of ion exchange resins.

It is a further object of the present invention to provide a means of controlling the concentration of sulfate in a process for the recovery of uranium compounds from an acidic solution by means of ion exchange resins.

It is still a further object of the present invention to provide a means of reducing the size of the bleed-off stream, thereby reducing the loss of valuable reagents.

Still further objects of the invention will be apparent upon a more complete understanding of the invention as hereinafter more fully described.

Briefly, in this process a sulfate solution bearing soluble uranium is passed through an ion exchange resin bed where a uranyl complex is sorbed by the resin. The resin is eluted with a nitrate solution and the eluate is neutralized to precipitate a uranium salt. After separation of the uranium salt the eluate is treated with an alkaline earth metal nitrate to precipitate the sulfate ions as the alkaline earth metal sulfate. Part of the eluate is removed as a bleed-off to prevent building up of impurities. The alkaline earth metal nitrate not only precipitates an insoluble sulfate but also serves to reconstitute the eluate with respect to the nitrate content. After further treatment the eluate is recycled to another resin bed bearing sorbed uranium values.

More in detail, a uranium bearing ore such as carnotite is contacted with sulfuric acid under conditions which will give an optimum solubilization of the uranium values. The acidulation conditions will vary with the nature of the ore being treated. The insoluble material is separated from the sulfate solution by suitable means such as settling, filtration and the like.

The clarified uranium bearing sulfate solution is passed through one or more beds of an ion exchange resin. Suitable resins, such as polystyrene quaternary amine type resins, will selectively sorb the uranium values from the sulfate solution as a uranyl sulfate complex. Examples of suitable resins are Amberlite IRA–400, Dowex–1, and Permutit SE, which are made according to the D'Alelio process, U.S. Patent No. 2,366,007. These resins are cross-linked polystyrene reacted with various polyamines and suitable quaternary ammonium bases, and exhibit strong basic action. Another suitable resin is Permutit A–300 which is disclosed in U.S. Patent No. 2,469,683 issued to Dudley and Lundberg.

After passing the sulfate solution through the resin bed and sorbing the uranium complex on the resin, the sulfate solution may be reconstituted and recycled for reaction with additional carnotite ore.

In the elution cycle, an ammonium nitrate solution, which has been adjusted to a pH of about 1.2 with sulfuric acid is passed through the resin bed to desorb the uranyl sulfate complex from the resin by means of ion exchange. After passing through the resin bed, the acidic ammonium nitrate eluate bearing soluble uranium values is classified or filtered to separate fine particles of resin or insoluble ore that may be present.

The clarified eluate is recovered and neutralized with an alkaline compound such as magnesium oxide or ammonia. When the pH of the eluate is adjusted to between about 6.8 and 7.1 with magnesium oxide, the major portion of the uranium is precipitated from solution, probably as a mixture of ammonium diuranate and magnesium uranate. When ammonia is used to neutralize the eluate, the uranium is precipitated as ammonium diuranate. The solid uranium compounds are separated from the barren eluate by a suitable means such as filtration and the like. The uranium bearing solids are dried and prepared for further processing.

The barren eluate, which is recovered during the separation of solid uranium compounds, is a dilute solution of ammonium nitrate containing sulfate, boron, and other impurities. A typical analysis of a barren eluate which was obtained by neutralizing the eluate with magnesium oxide and separating the uranium bearing solids is as follows:

| Component: | Percent by weight |
|---|---|
| $H_2O$ | 90.26 |
| $NH_4$ | 1.68 |
| $NO_3$ | 3.79 |
| $SO_4$ | 3.72 |
| Mg | 0.55 |
| $U_3O_8$ | 0.003 |

In order that the barren eluate may be reused to eluate additional uranium bearing resin beds, the concentration of sulfate, boron, and other impurities in the eluate must be decreased and the ammonium nitrate concentration must be increased. It has been found that the sulfate concentration of the eluate can be controlled by reacting the eluate with an alkaline earth metal nitrate which will form an insoluble sulfate. Calcium nitrate, barium nitrate and strontium nitrate are suitable reagents for the precipitation of an insoluble sulfate from the eluate. It will be recognized that chemical equivalents of these compounds will also give satisfactory results. For example, a mixture of calcium oxide and nitric acid may be used in place of calcium nitrate. The nitrate compound may be added in a solid form or in solution form.

The quantity of alkaline earth metal nitrate that is added to the eluate depends upon the concentration of sulfate in the eluate. Generally, increasing the amount of nitrate compound added to the eluate will increase the amount of sulfate that is precipitated. However, after the sulfate concentration of the eluate has been reduced to less than about 0.3% by weight, the addition of the nitrate compound does not precipitate a significant amount of sulfate. When the concentration of sulfate is greater than about 0.3% by weight, the major portion of the alkaline earth metal cation precipitates with the sulfate and a minor portion remains soluble in the eluate. However, when the concentration of the sulfate is reduced to less than about 0.3% by weight, a minor portion of the alkaline earth metal cation precipitates with the sulfate and a major portion remains soluble in the eluate. Under the latter conditions, the eluate becomes contaminated with the alkaline earth metal cation, even though the sulfate impurity is reduced.

Increasing the time of reaction between the alkaline earth metal nitrate and the eluate will increase the amount of sulfate precipitated. However, the optimum reaction time has been found to be about one hour when the precipitation is carried out at room temperature.

After the alkaline earth metal sulfate has been precipitated, it may be removed from the eluate by settling, filtration and the like. A small portion of the clarified eluate, less than about 10%, is discarded to prevent the build up of boron and other impurities. If sulfate is not removed from the eluate by precipitation methods, it is necessary to discard about 20% of the eluate in order to control the concentration of sulfate below the crystallization point of ammonium-magnesium double salts or other undesirable sulfate salts. It can be seen that by precipitating sulfate in the manner described above, the loss of ammonium nitrate and uranium values in the bleed-off stream can be reduced by about 50% or more.

After the precipitation of the alkaline earth metal sulfate, and the removal of part of the impurities in the bleed-off stream, the eluate may be ammoniated, and treated with sulfuric acid to adjust the pH to about 1.2. The reconstituted solution may then be used to elute a resin bed bearing uranium.

The instant process may be modified to include the addition of the nitrate compound to the uranium bearing eluate prior to the addition of the neutralizing agent. After the addition of the nitrate compound, an insoluble sulfate is precipitated, which is separated from the uranium bearing eluate by settling, filtration and the like. When filtration is used to separate the solids from the eluate, the solid alkaline earth metal sulfate serves as a filter aid in separating resin particles and insoluble ore particles that are also present in the uranium bearing eluate. The clarified uranium bearing eluate is recovered and neutralized to precipitate the uranium values.

As illustrative of the character of the instant invention, but in nowise intending to be limited thereby, the following examples are described:

EXAMPLES I–IV

A carnotite ore from the Colorado Plateau was reacted with sulfuric acid and leached with water to recover a solution bearing soluble uranium. This solution was passed through a bed of Amberlite IRA–400 ion exchange resin where a uranyl sulfate complex was sorbed on the resin. The sulfuric acid solution was then recycled to react with additional carnotite ore.

The resin bed was then eluted with an ammonium nitrate solution which was adjusted to a pH of about 1.2 with sulfuric acid. The composition of the uranium bearing eluate was as follows:

| Component: | Percent by weight |
|---|---|
| $SO_4$ | 3.72 |
| $NO_3$ | 3.79 |
| $NH_3$ | 1.68 |
| $U_3O_8$ | 0.70 |

Magnesium oxide, which was essentially —100 mesh, was added to the pregnant eluate in an amount equivalent to about 100% of the theoretical amount required to obtain a pH of about 7.0. After reacting for about 220 minutes, the resulting slurry was filtered to recover a solid uranium salt and a clarified barren eluate. The barren eluate analyzed as follows:

| Component: | Percent by weight |
|---|---|
| Mg | 0.55 |
| $SO_4$ | 3.72 |
| $NH_4$ | 1.68 |
| $NO_3$ | 3.79 |
| Ca | 0.0 |
| $H_2O$ | 90.26 |

Portions A, B, C, D, and E were separated from this solution. A calcium nitrate solution, having a Ca content of about 1.8% by weight was reacted with portions A, B, C and D in the amounts shown in Table I. The reactants were allowed to stand for about one hour and filtered. The analyses of the clarified extracts are shown in Table I.

*Table I*

| Example | Portion | Parts of Ca $(NO_3)_2$* per 100 parts of eluate | Components in Filtrate | |
|---|---|---|---|---|
| | | | Percent Ca | Percent $SO_4$ |
| I | A | 0.86 | 0.10 | 2.93 |
| II | B | 1.90 | 0.08 | 2.19 |
| III | C | 3.57 | 0.08 | 1.17 |
| IV | D | 6.84 | 0.35 | 0.35 |

*Added as a solution containing about 1.8% Ca by weight.

The above examples show that increasing the amount of calcium nitrate added will decrease the amount of sulfate remaining in solution, without contaminating the eluate with the calcium ion. It can also be seen that the sulfate content of the eluate can be reduced to an insignificant amount by this method.

EXAMPLE V

One hundred parts by weight of portion E was reacted with 2.5 parts by weight of solid calcium nitrate. After agitation for about one hour at a temperature of about 25° C., the mixture was filtered. The filtrate contained about 1.75% by weight of $SO_4$ and the filter cake contained about 3.5 parts of gypsum per 100 parts of portion E.

Having thus fully described and illustrated the invention, what is desired to be secured and claimed by Letters Patent is:

1. In a process in which an aqueous sulfate solution bearing soluble uranium is passed through an ion exchange resin bed, whereby a uranyl complex is sorbed by the resin, the resin is eluted with an aqueous ammonium nitrate solution, the uranium-bearing ammonium nitrate eluate is neutralized to precipitate a solid uranium salt, the uranium salt is separated from the barren eluate, a minor portion of the barren eluate is removed and discarded, and the remainder of the barren eluate is reconstituted for recycle to eluate a uranium-bearing resin bed, the improved method of controlling impurities in the recycled stream which comprises the steps of reacting the ammonium nitrate eluate with an alkaline earth metal nitrate selected from the group consisting of calcium nitrate, barium nitrate, and strontium nitrate, whereby an insoluble alkaline earth metal sulfate is precipitated, and separating said alkaline earth metal sulfate.

2. The improved method of claim 1 wherein the alkaline earth metal nitrate is reacted with the uranium-bearing ammonium nitrate eluate prior to neutralization of said uranium-bearing eluate.

3. The improved method of claim 1 wherein the alkaline earth metal nitrate is reacted with barren eluate.

4. The improved method of claim 1 wherein said alkaline earth metal nitrate is reacted with the ammonium nitrate eluate in an amount to reduce the sulfate concentration of said eluate, after precipitation and separation of insoluble alkaline earth metal sulfate, to not less than about 0.3% by weight.

References Cited in the file of this patent

McPherson et al.: "Chemistry," Ginn & Co. (1940), p. 583.

ACCO-59, AEC Document, July 29, 1954, pp. 5-13.

ACCO-68, AEC Document, 1954, pp. 39-44.

(Copies of above AEC documents available in the Scientific Library or from the Office of Technical Services, Dept. of Comm., Washington 25, D.C.)